United States Patent
Lee et al.

(10) Patent No.: US 7,372,835 B2
(45) Date of Patent: May 13, 2008

(54) HANDOFF SYSTEM AND METHOD OF DUAL MODE MOBILE FOR CONNECTING MOBILE COMMUNICATION SYSTEM AND WIRELESS NETWORK

(75) Inventors: Sang Do Lee, Suwon-si (KR); Ji Cheol Lee, Yongin-si (KR); Sung Won Lee, Sungnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 226 days.

(21) Appl. No.: 11/246,113

(22) Filed: Oct. 11, 2005

(65) Prior Publication Data
US 2006/0077934 A1    Apr. 13, 2006

(30) Foreign Application Priority Data
Oct. 11, 2004    (KR) .................. 10-2004-0081104

(51) Int. Cl.
*H04Q 7/20*    (2006.01)
*H04Q 7/22*    (2006.01)

(52) U.S. Cl. .............. 370/331; 370/329; 370/328; 370/334; 370/338; 370/310; 370/341; 370/333; 455/436; 455/426.1; 455/426.2; 455/437; 455/438; 455/466; 455/445

(58) Field of Classification Search ............. 370/331, 370/329, 328, 334, 338, 310, 341, 343, 913, 370/395.4, 333, 339, 395.53, 352, 353, 354, 370/356, 357; 455/436, 426.1, 426.2, 422.1, 455/403, 466, 437, 438, 439, 440, 441, 442, 455/443, 444, 500, 517, 445, 550.1, 414.1, 455/414.2, 414.3, 414.4
See application file for complete search history.

(56) References Cited
U.S. PATENT DOCUMENTS

| | | | |
|---|---|---|---|
| 2002/0021681 A1 | 2/2002 | Madour | |
| 2004/0008645 A1* | 1/2004 | Janevski et al. | ............ 370/331 |
| 2004/0028009 A1* | 2/2004 | Dorenbosch et al. | ....... 370/329 |
| 2004/0105413 A1 | 6/2004 | Menon et al. | |
| 2005/0025164 A1* | 2/2005 | Kavanagh et al. | .......... 370/401 |

* cited by examiner

Primary Examiner—Keith Ferguson
(74) Attorney, Agent, or Firm—Roylance, Abrams, Berdo & Goodman, L,L,P,

(57) ABSTRACT

An active handoff system and method of a dual mode terminal capable of connecting to a wireless network, such as wireless local area network (LAN), and a mobile communication system are provided. The handoff method includes the steps of assigning, at a packet data service node of the mobile communication system, an IP address to the dual mode terminal connected to the service network, establishing, at the packet data service node, a tunneling path to the wireless LAN when the dual mode terminal moves from the mobile communication network to the wireless LAN, and disconnecting, at the packet data service node, the tunneling path to the wireless LAN, and establishing a tunneling path to another packet data service node whose Internet Protocol (IP) address has been established by the packet data service node, when the dual mode terminal moves from the wireless LAN to the mobile communication system. A dual mode terminal that moves from a 3G mobile communication system to a wireless network in an active state maintains an existing IP address assigned from an active 3G mobile communication system so that the dual mode terminal can maintain an upper layer session and transmit an IP packet to a terminal located in a 3G mobile communication system.

18 Claims, 16 Drawing Sheets

HANDOFF SYSTEM AND METHOD OF DUAL MODE MOBILE FOR CONNECTING MOBILE COMMUNICATION SYSTEM AND WIRELESS NETWORK

CLAIM OF PRIORITY

This application claims benefits under 35 U.S.C. § 119 from a Korean Patent Application Serial No. 2004-81104 filed in the Korean Intellectual Property Office on Oct. 11, 2004 the entire disclosure of which is hereby incorporated by reference.

BACKGROUND OF THE INVENTION

1. Field of the Invention

The present invention relates to an active handoff system and method of a dual mode mobile terminal capable of connecting to different kinds of networks. More particularly, the present invention relates to an active handoff system and method of a dual mode mobile terminal enabling a handoff of a dual mode mobile terminal having an Internet Protocol (IP) address assigned by a mobile communication system, between the mobile communication system and a wireless network, for example a wireless local area network (LAN), without change in the IP address of the mobile terminal.

2. Description of the Related Art

In General, "handoff" refers to a function that prevents call disconnection in a process of moving from one base station to another as a mobile phone user moves.

Mobile phone handoffs include a soft handoff performed between base stations, a hard handoff performed between converters, and a softer handoff performed between sectors of a base station.

The soft handoff is a technique by which a base station disconnects a signal of a mobile phone user after the signal is received by another base station, and the hard handoff is a technique by which a base station transfers a signal of a mobile phone user after disconnecting the signal.

Accordingly, a conventional handoff is performed within a single network.

In relation to a method of performing a conventional handoff between different kinds of networks, FIG. 1 illustrates the case of moving from a wireless LAN region 2 to a cellular network region 1 using a mobile IP address of a dual mode mobile terminal.

As mentioned above, a conventional handoff between different kinds of networks is performed by a mobile communication system equipped with Packet Data Serving Node (PDSN) 11 and base stations (BSS) 12, and a wireless LAN equipped with an Access Router (AR) 21 and an Access Point (AP) 22, 4, a Correspondent Node (CN) 3 host equipped with a Home Agent (HA) 31, and a dual mode mobile terminal.

The PDSN of the mobile communication system is an exchange network providing a mobile terminal connecting to an IP network through a mobile communication system and the terminal's user with a charging/authentication function, a Point-to-Point (PPP) connection function, an IP routing function, a vertical handoff function, and so on.

Also, if mobile IP is supported, an external identification agent is employed.

The base station of the mobile communication system is composed of equipment for managing a wireless connection standard of a mobile terminal connecting to the mobile communication system.

The AR of the wireless LAN provides a mobile terminal connecting to an IP network through a mobile communication system and the terminal's user with a charging/authentication function, a PPP connection function, an IP routing function, a vertical handoff function, etc.

Also, if mobile IP is supported, an external identification agent is employed.

The AP of the wireless LAN manages connection standards between the mobile terminal connecting to the wireless LAN and the wireless LAN, and serves as a bridge between the wireless LAN and a wired LAN.

The HA is equipment that supports a mobile IP function.

Also, the CN refers to a server and host that can be connected to through the dual mode mobile terminal and the IP network and perform data communication or provide service to a user.

Lastly, the dual mode mobile terminal is a terminal that can connect to both a wireless LAN and a mobile communication system.

In such a convention method of handoff between different kinds of networks, a mobile terminal using a home IP address can continue to use the same address even after moving from a wireless LAN to a 3G mobile communication network, and the home agent takes over and forwards all packets transmitted to the terminal to a network in which the terminal is actually located. Thus, the method enables a handoff that is, to a predetermined extent, not subject to disconnection.

However, in the conventional method of handoff between different kinds of networks, a delay can occur due to signal transmission and mobility estimation which varies with mobile IP, resulting in a problem of traffic congestion at the home agent, and so on. Consequently, mobile IP addresses are not supported in 3G mobile communication systems currently in use.

SUMMARY OF THE INVENTION

It is, therefore, an objective of the present invention to provide an active handoff system and method of a dual mode terminal capable of connecting to a wireless LAN and a mobile communication network which enable a handoff to be performed therebetween without changing an IP address assigned to the dual mode terminal.

According to an aspect of the present invention, there is provided a handoff method of a dual mode terminal capable of connecting to a mobile communication system and a wireless network, for example a wireless local area network (LAN), comprising the steps of assigning, at a old packet data service node of the mobile communication system, an IP address to the dual mode terminal connected to the old PDSN, establishing, at the old packet data service node, a tunneling path to access router when the dual mode terminal moves from the mobile communication network to the wireless LAN, and releasing, at the a new packet data service node, the tunneling path to the access router according to IP establishment option message when the dual mode terminal moves from the wireless LAN to the mobile communication system.

According to another aspect of the present invention, there is provided a handoff method of a dual mode terminal capable of connecting to a mobile communication system and a wireless network, the method comprising the steps of assigning, at a old packet data service node of a mobile communication system, an IP address to a dual mode terminal connected to the old PDSN; establishing, at the old PDSN, a tunneling path to a access router when the dual mode terminal moves from a mobile communication network to the wireless network; and establishing, at a new PDSN, a tunneling path to the old PDSN according to IP establishment option message when the dual mode terminal moves from the wireless network to the mobile communication system.

According to still another aspect of the present invention, there is provided a handoff system of a dual mode terminal capable of connecting to a mobile communication system and a wireless network, for example a wireless local area network (LAN), the system comprising a packet data service node for performing a handoff by establishing and releasing a tunneling path to the wireless LAN or another packet data service node, and assigning an IP address to the dual mode terminal, and a wireless LAN for performing a handoff through a tunneling path to the packet data service node when the dual mode terminal enters into the wireless LAN.

BRIEF DESCRIPTION OF THE DRAWINGS

A more complete appreciation of the present invention, and many of the attendant advantages thereof, will be more apparent and better understood by reference to the following detailed description of the exemplary embodiments of the present invention when considered in conjunction with the accompanying drawings, in which like reference symbols indicate the same or similar components, wherein.

DETAILED DESCRIPTION OF EXEMPLARY EMBODIMENTS

An active handoff system and method of a dual-mode terminal capable of connecting to a wireless network and a mobile communication system in accordance with a first exemplary embodiment of the present invention will now be described in detail with reference to the accompanying drawings.

Figure 1:
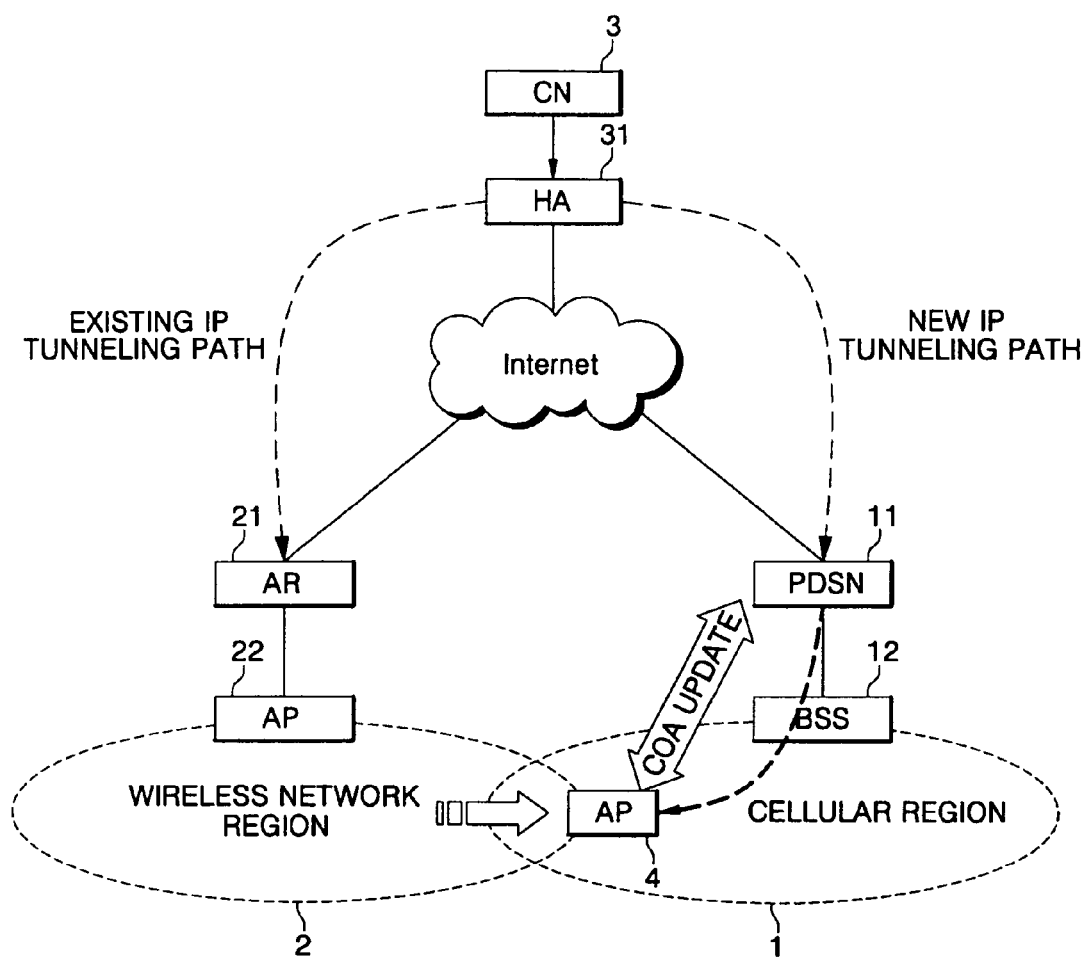
FIG. 1 is a block diagram of a conventional system for performing a handoff between different kinds of networks.
Figure 2:
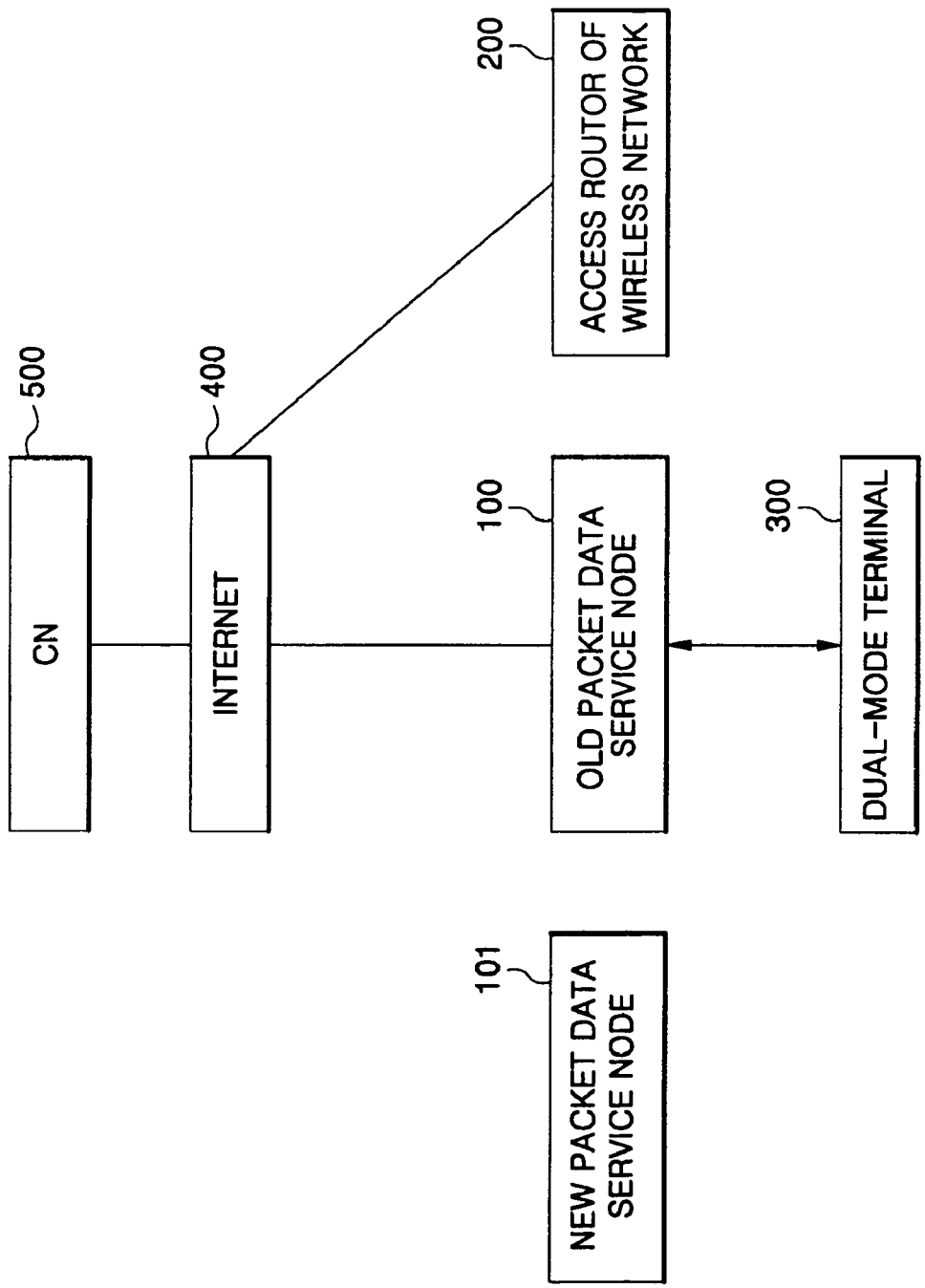
FIG. 2 is a block diagram of an active handoff system of a dual mode terminal capable of connecting to a wireless network and a mobile communication system in accordance with a first exemplary embodiment of the present invention.

FIG. 2 is a block diagram showing an active handoff system of a dual-mode terminal capable of connecting to a wireless network and a mobile communication system in accordance with a first exemplary embodiment of the present invention, wherein the active handoff system includes a packet data service node 100, a access router of wireless network 200, and a dual-mode terminal 300. Correspondent Node (CN) 500 is coupled with Internet 400.

The packet data service node 100 simultaneously establishes a PPP session and an IP address when it is connected with the dual-mode terminal 300 for the first time.

Further, when the dual-mode terminal 300 moves to the wireless network, a tunneling path is established between the packet data service node 100 and the access router of wireless network 200.

When the dual-mode terminal 300 moves from the wireless network to the mobile communication system, the packet data service node 100 determines whether the IP address of the dual mode terminal 300 was established by the packet data network 100. When it is determined that the IP address of the dual-mode terminal 300 was established by the packet data service node 100, the packet data service node 100 releasing the tunneling path established with the access router of wireless network 200 and then resets up routing information and a proxy.

Here, the packet data service node 100 transmits and receives an IP establishment option message to and from the dual-mode terminal 300.

Further, the packet data service node 100 releasing the tunneling path established with the access router of wireless network 200 and determines whether the IP address of the dual mode terminal 300 was established by the packet data network 100 using an IP establishment option message. When it is determined that the IP address of the dual-mode terminal 300 was not established by the packet data service node 100, the packet data service node 100 performs the handoff through a tunneling path established with an new packet data service node 101. When it is determined that the IP address of the dual mode terminal 300 was established by the packet data service node 100, the packet data service node 100 releasing the tunneling path established with the access router of wireless network 200 and, at the same time, resets up routing information and a proxy of the dual-mode terminal 300.

Further, when the dual-mode terminal 300 enters into an area of the access router of wireless network 200, the access router of wireless network 200 performs a handoff through a tunneling path established with the packet data service node 100.

Further, the dual-mode terminal 300 transmits and receives an IP establishment option message to and from the packet data service node 100 and then provides its own information.

Figure 6:
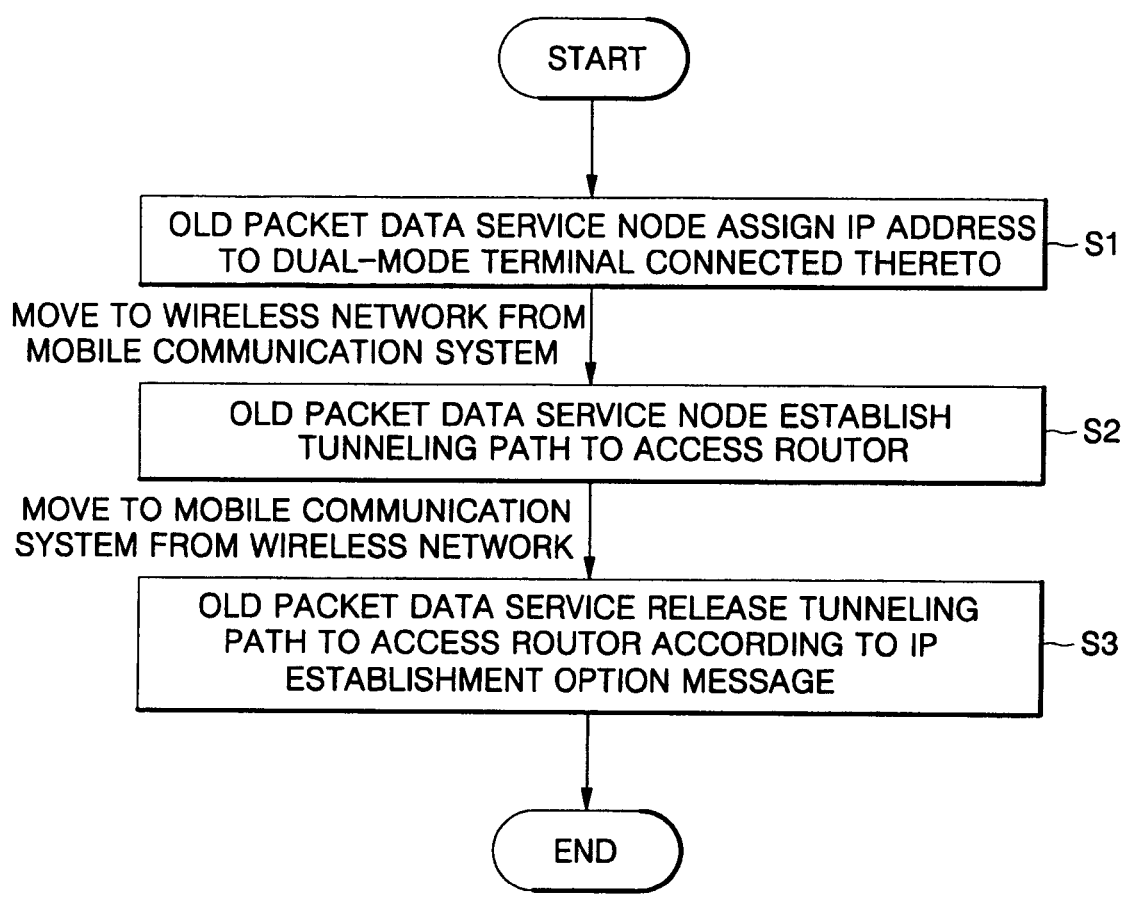
FIG. 6 is a flowchart of an active handoff method of a dual mode terminal capable of connecting to a wireless network and a mobile communication system in accordance with a first exemplary embodiment of the present invention.

An active handoff method of a dual-mode terminal capable of connecting to a wireless network and a mobile communication system in accordance with a first exemplary embodiment of the present invention is described with reference to FIG. 6 as follows.

In a handoff method of a dual-mode terminal capable of connecting to the mobile communication system and a wireless LAN network, first, the old packet data service node 100 of the mobile communication system establishes a PPP session with the dual-mode terminal 300 and, at the same time, assigns an IP address to the dual-mode terminal 300 (step S1).

That is, when the dual-mode terminal 300 originates a packet data call as shown in FIG. 2, the old packet data service node 100 assigns radio resources including a traffic channel to the dual-mode terminal 300 through a base transceiver station, and establishes a PPP link between the dual-mode terminal 300 and the old packet data service node 100.

Figure 3:
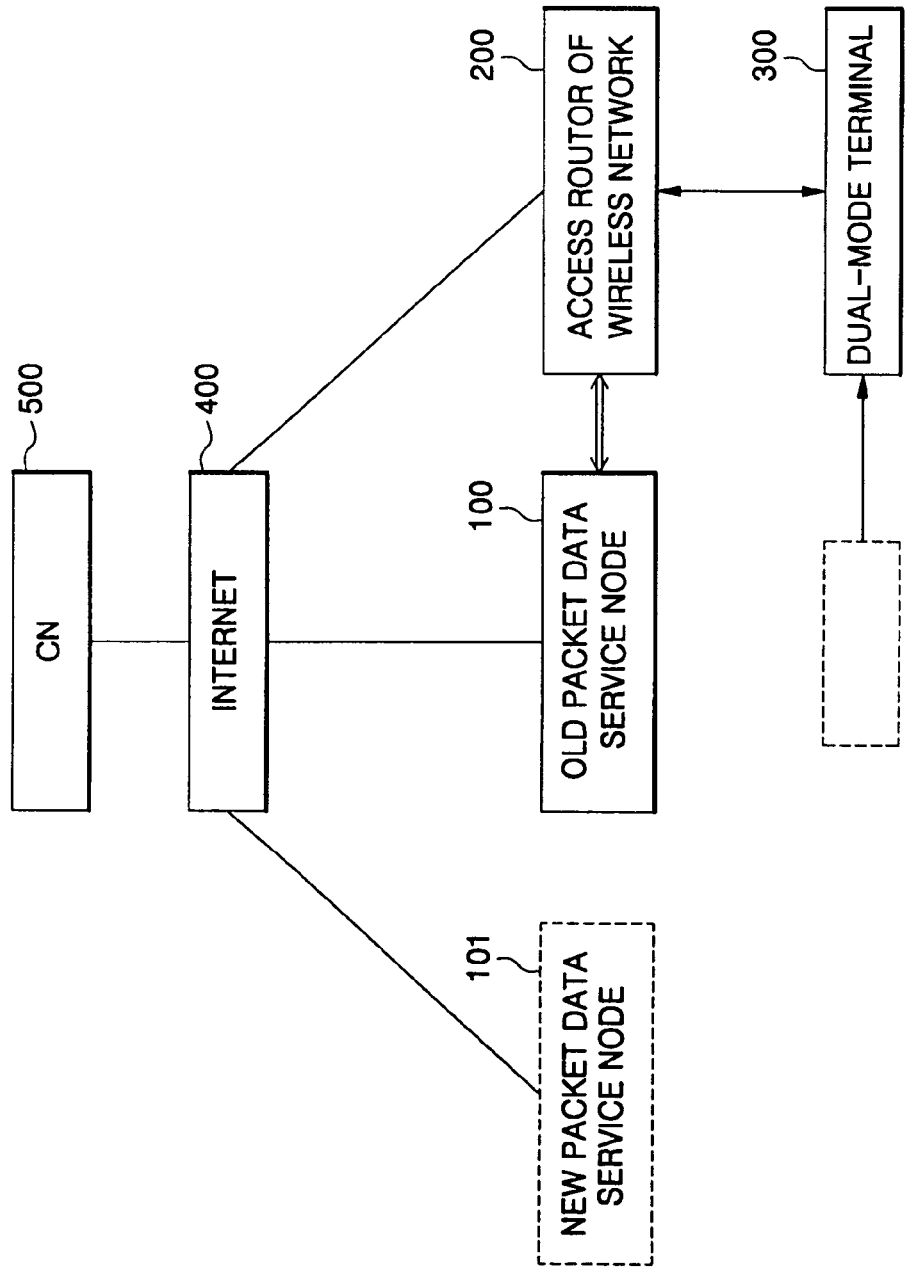
FIG. 3 is a view showing a state in which a dual mode terminal moves from a packet data service node to a wireless LAN in the active handoff system of a dual mode terminal capable of connecting to a wireless network and a mobile communication system according to FIG. 2.

When the dual-mode terminal 300 moves to the wireless network from the mobile communication system as shown in FIG. 3, the old packet data service node 100 establishes a tunneling path with the access router of wireless network 200 (step S2).

Figure 7:
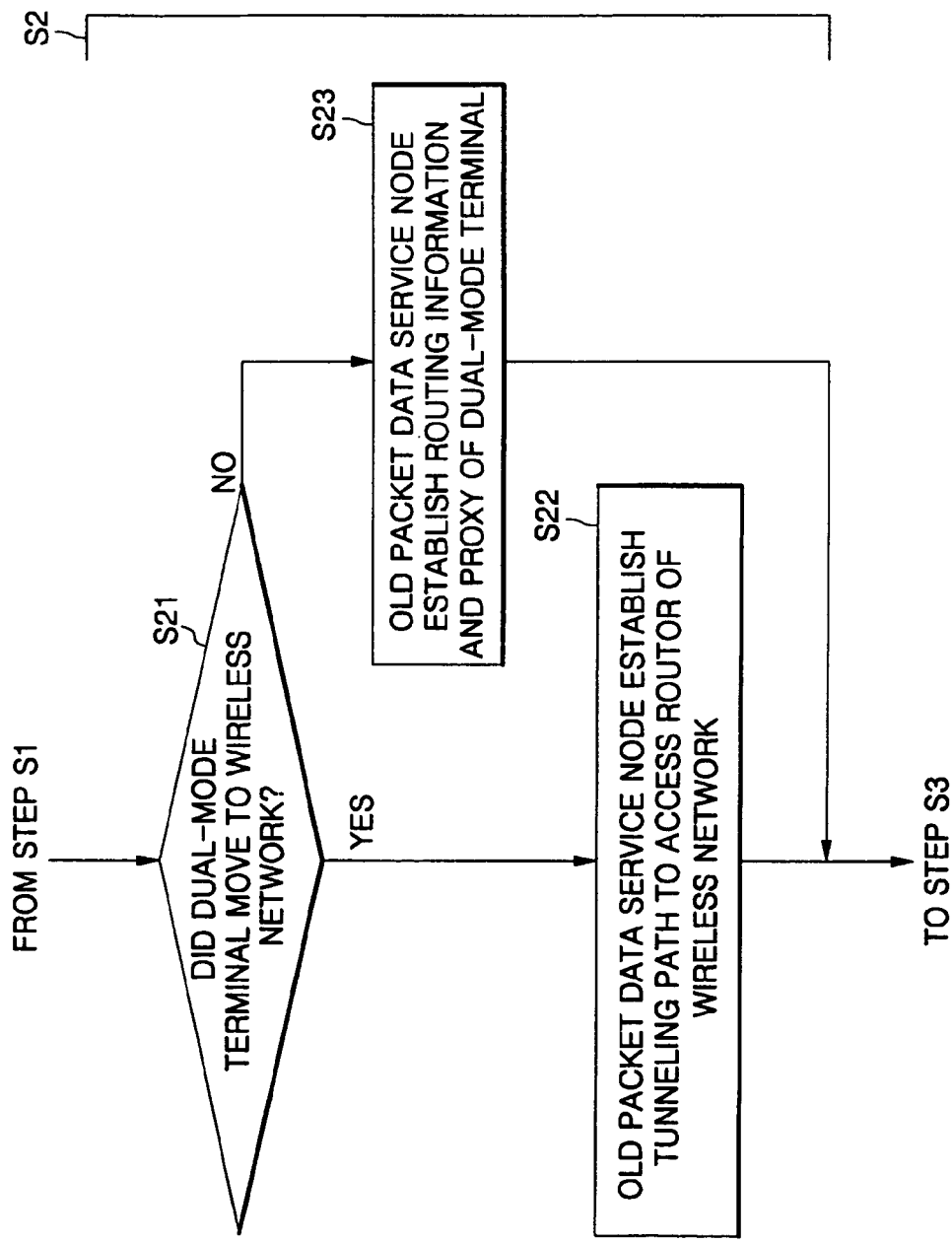
FIG. 7 is a flowchart showing in detail step S2, where a packet data service node 100 establishes a tunneling path to a wireless LAN 200, in the active handoff method of a dual mode terminal capable of connecting to a wireless network and a mobile communication system according to FIG. 6.

Step S2, where the old packet data service node 100 establishes the tunneling path with the access router of wireless network 200, will now be described in greater detail with reference to FIG. 7.

First, the old packet data service node 100 transmits and receives an IP establishment option message to and from the dual-mode terminal 300, and then determines whether the dual-mode terminal 300 moved to wireless network (step S21). Here, the IP establishment option message communicated between the packet data service node 100 and the dual-mode terminal 300 includes the IP address of the dual-mode terminal 300 and anchor IP address.

When it is determined that the dual-mode terminal 300 moved to wireless network (YES in step S21), the old packet data service node 100 establishes a tunneling path with the access router of wireless network 200 (step S22).

On the other hand, when it is determined that that the dual-mode terminal 300 did not move to wireless network (NO in step S21), the old packet data service node 100 sets up routing information and a proxy of the dual-mode terminal 300 (step S23).

Figure 5:
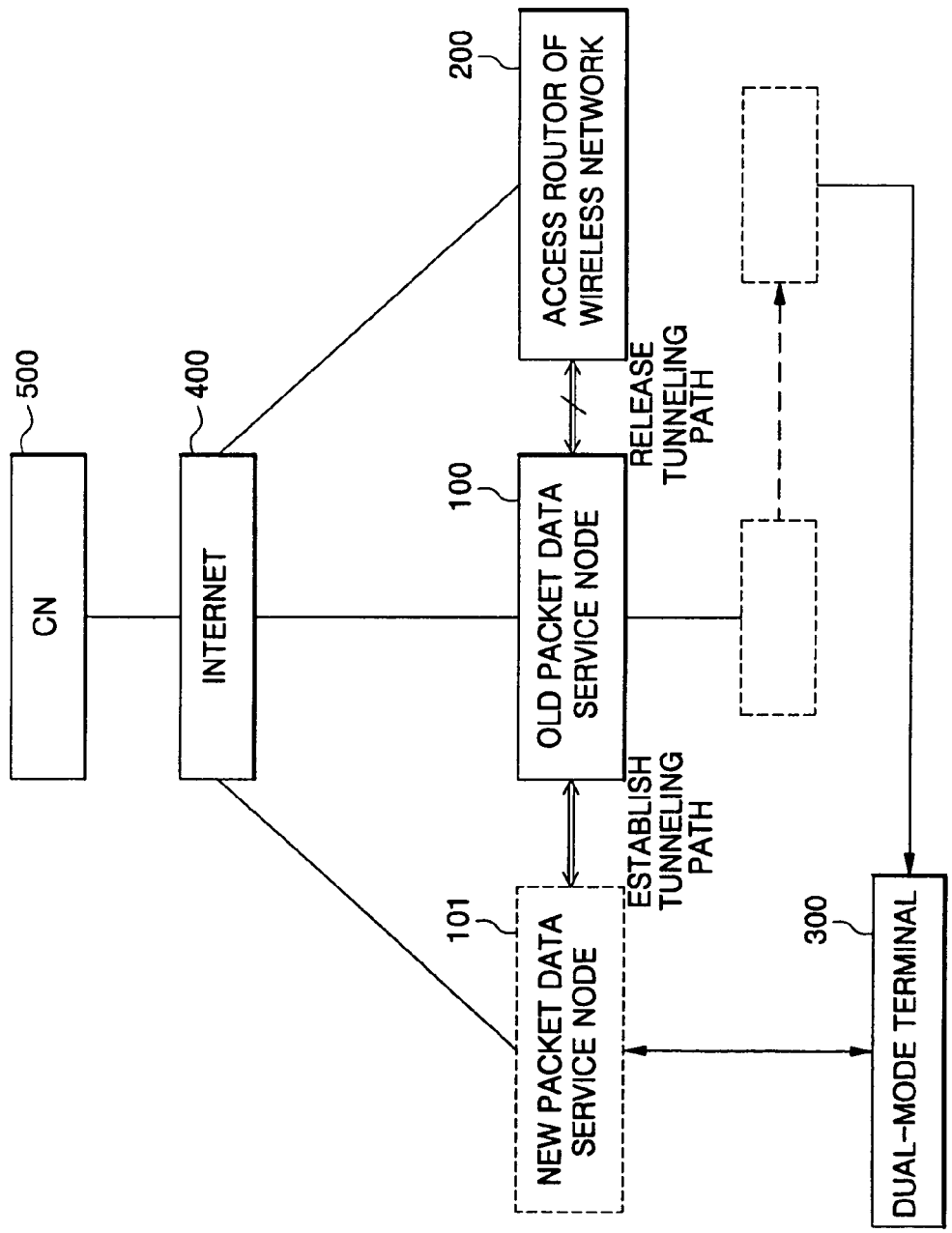
FIG. 5 is a view showing a state in which a dual mode terminal moves from a wireless LAN to another packet data service node in the active handoff system of a dual mode terminal capable of connecting to a wireless network and a mobile communication system according to FIG. 2.

Further, when the dual-mode terminal 300 moves from wireless network to the packet data service node 101 of mobile communication system as shown in FIG. 5, the old packet data service node 100 releasing the tunneling path to the access router of wireless network 200 and also establishes a tunneling path to the new packet data service node 101 whose IP address was established by the new packet data service node 101 (step S3).

Figure 8:
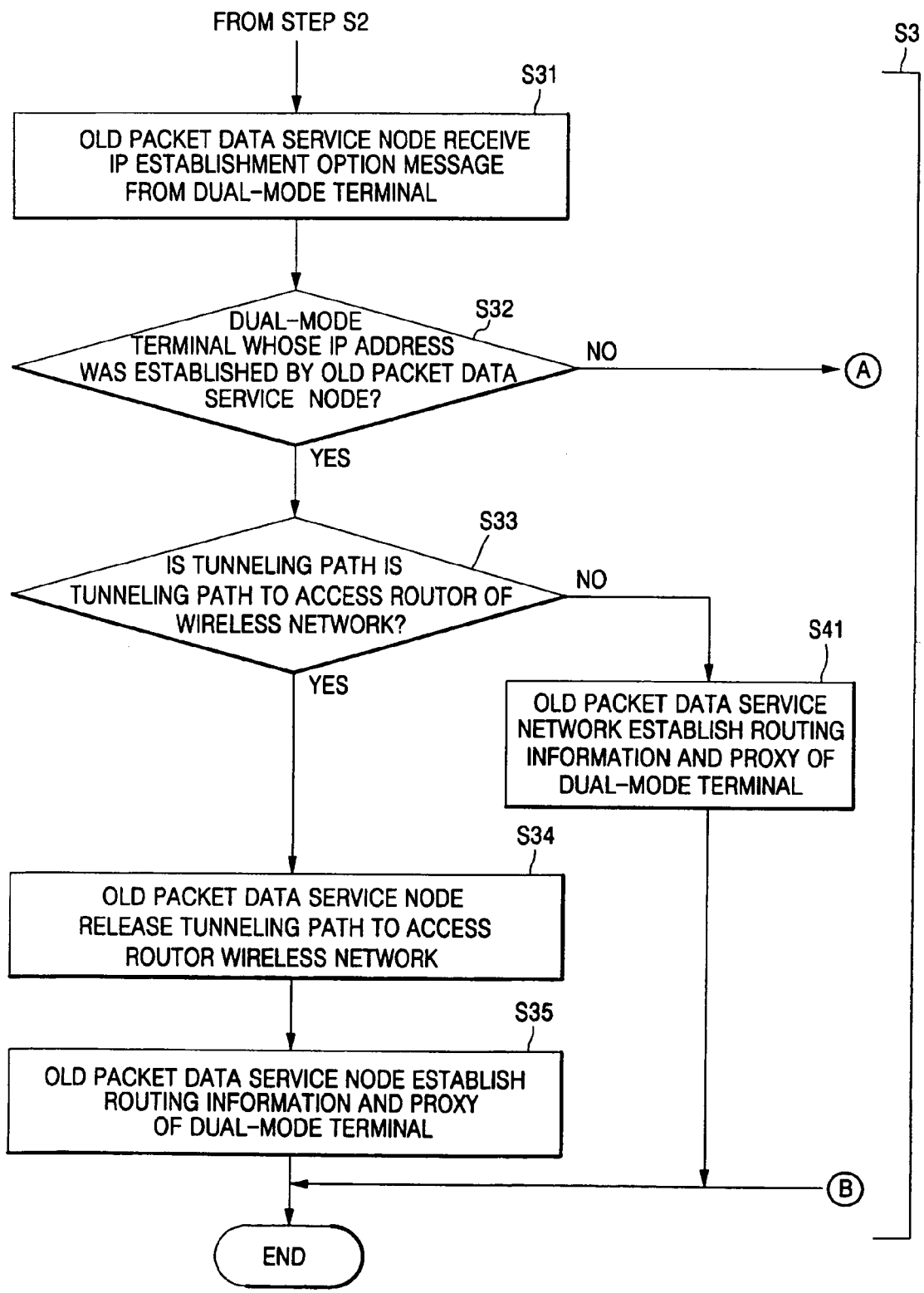
FIG. 8 is a flowchart showing in detail step S3, where a packet data service node 100 releasing a tunneling path to a wireless LAN 200 and establishes a tunneling path to an new packet data service node 101 whose IP address was established by the packet data service node, in the active handoff method of a dual mode terminal capable of connecting to a wireless network and a mobile communication system according to FIG. 6.

Step S3, where the old packet data service node 100 releasing the tunneling path to the access router of wireless network 200 and also establishes a tunneling path to the new packet data service node 101 whose IP address was established by the new packet data service node 101, will now be described in greater detail with reference to FIG. 8.

Figure 4:
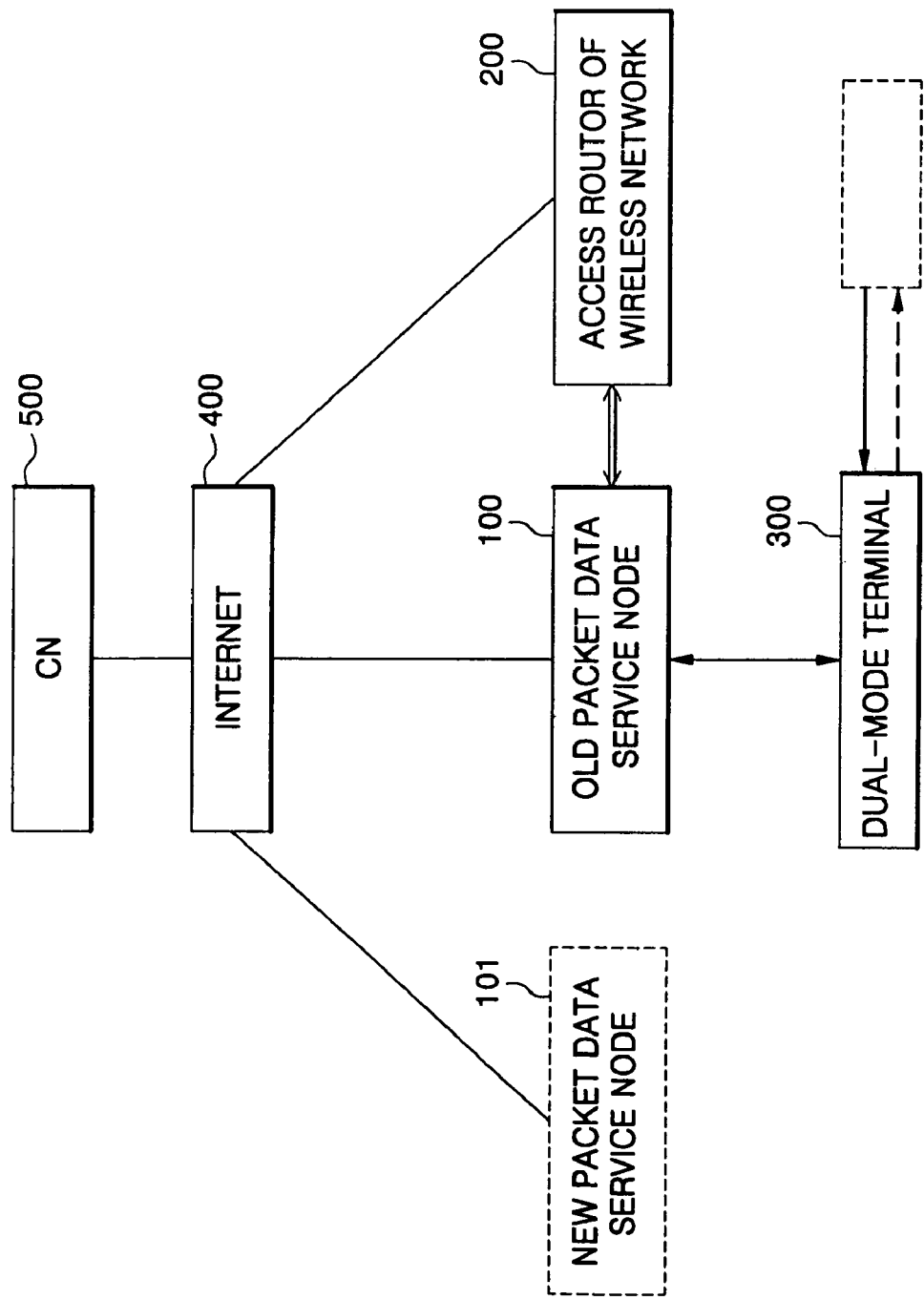
FIG. 4 is a view showing a state in which a dual mode terminal moves from a wireless LAN to a packet data service node in the active handoff system of a dual mode terminal capable of connecting to a wireless network and a mobile communication system according to FIG. 2.

First, the old packet data service node 100 receives an IP establishment option message from the dual-mode terminal 300 as shown in FIG. 4 (step S31).

Further, the old packet data service node 100 determines whether an IP address of the dual-mode terminal 300 was established by the old packet data service node 100 (step S32).

Here, when it is determined that the IP address of the dual-mode terminal 300 was established by the 100 packet data service node 100 (YES in step S32), the old packet data service node 100 determines whether there is a tunneling path to the access router of wireless network 200 (step S33).

When it is determined that there is a tunneling path to the access router of wireless network 200 (YES in step S33), the old packet data service node 100 releasing the tunneling path to the access router of wireless network 200 (step S34).

Subsequently, the old packet data service node 100 sets up routing information and the proxy of the dual-mode terminal 300 (step S35).

Meanwhile, when it is determined that there is no tunneling path to the access router of wireless network 200 (NO in step S33), the old packet data service node 100 sets up routing information and the proxy of the dual-mode terminal 300 (step S41).

Figure 9:
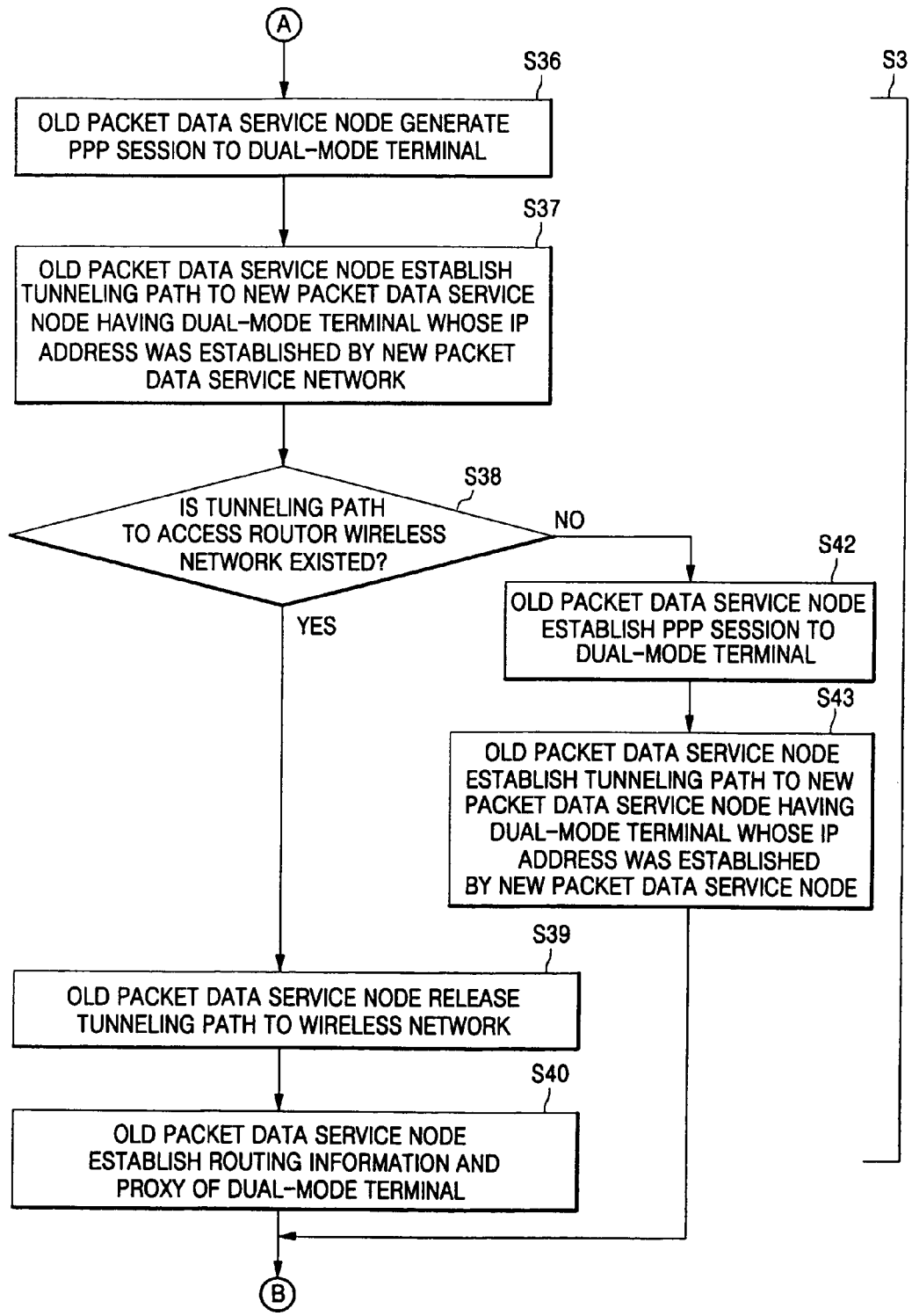
FIG. 9 is a flowchart showing in detail step S3, where a packet data service node 100 releasing a tunneling path to a wireless LAN 200 and establishes a tunneling path to an new packet data service node 101 whose IP address was established by the packet data service node, in the active handoff method of a dual mode terminal capable of connecting to a wireless network and a mobile communication system according to FIG. 6.

On the other hand, when it is determined that the IP address of the dual-mode terminal 300 terminal was not established by the old packet data service node 100 (NO in step S32), as shown in FIGS. 5 and 9, the old packet data service node 100 establishes a PPP session with the dual-mode terminal 300 (step S36).

Subsequently, the old packet data service node 100 establishes a tunneling path to the new packet data service node 101 which established the IP address of the dual-mode terminal 300 (step S37).

Then, the old packet data service node 100 determines whether there is a tunneling path to the access router of wireless network 200 (step S38).

Here, when it is determined that there is a tunneling path to the access router of wireless network 200 (YES in step S38), the old packet data service node 100 releasing the tunneling path to the access router of wireless network 200 (step S39).

Subsequently, the old packet data service node 100 sets up routing information and the proxy of the dual-mode terminal 300 (step S40).

Further, when it is determined that there is no tunneling path to the access router of wireless network 200 (NO in step S38), the old packet data service node 100 establishes a PPP session with the dual-mode terminal 300 (step S42).

Subsequently, the old packet data service node 100 establishes a tunneling path to the new packet data service node 101 which established the IP address of the dual-mode terminal 300 (step S43).

Figure 10:
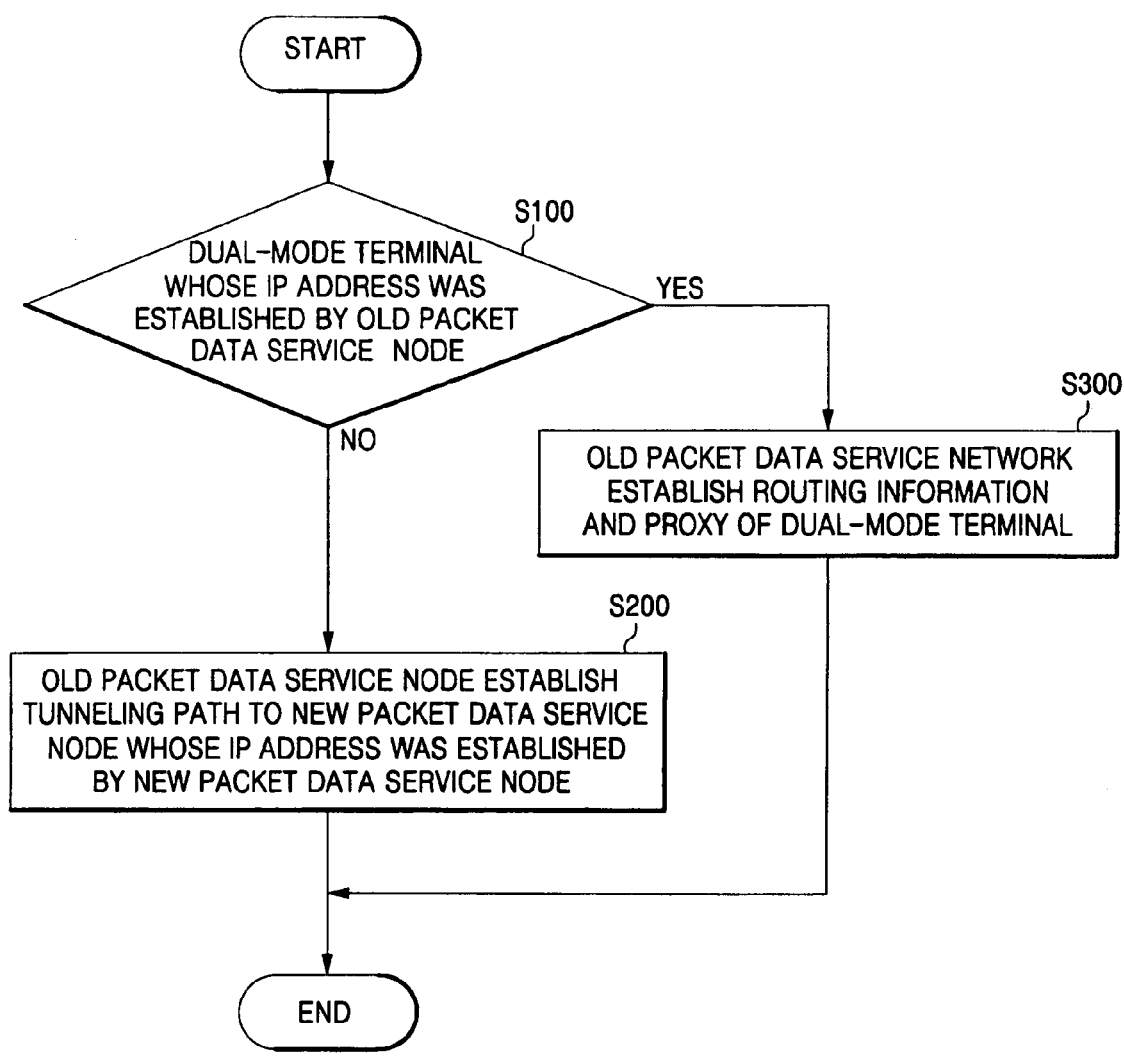
FIG. 10 is a flowchart of an active handoff method of a dual mode terminal capable of connecting a wireless LAN and a mobile communication system in accordance with a second exemplary embodiment of the present invention.

An active handoff method of a dual-mode terminal capable of connecting to a wireless network and a mobile communication system in accordance with a second exemplary embodiment of the present invention will now be described with reference to FIG. 10.

In a handoff method of a dual-mode terminal as the terminal moves from a wireless LAN network region to a mobile communication system region, first, the old packet data service node 100 determines whether the IP address of the dual-mode terminal 300 was established by the old packet data service node 100 (step S100).

Figure 11:
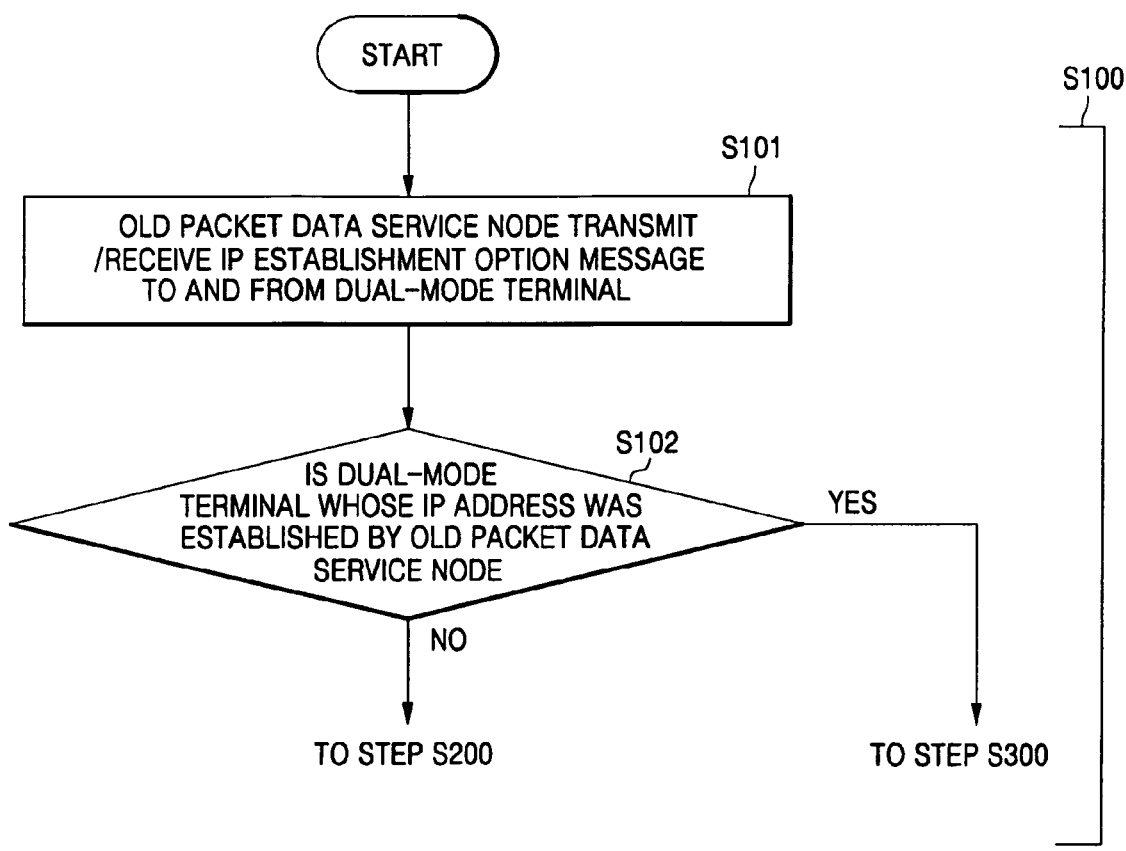
FIG. 11 is a flowchart showing in detail step S100, where a packet data service node 100 determines whether an IP address of a dual mode terminal 300 was established by the packet data service node 100, in the active handoff method of a dual mode terminal capable of connecting to a wireless network and a mobile communication system according to FIG. 10.

Step S100, where it is determined whether the IP address of the dual-mode terminal 300 was established by the old packet data service node 100, will now be described in greater detail with reference to FIG. 11.

First, the old packet data service node 100 transmits and receives an IP establishment option message to and from the dual-mode terminal 300 (step S101). At this time, the IP establishment option message that the old packet data service node 100 receives from the dual-mode terminal 300 includes an IP address and an anchor IP address.

Subsequently, the old packet data service node 100 determines whether the IP address of the dual mode terminal 300 was established by the old packet data service node 100 for using the IP establishment option message (step S102).

Here, when it is determined that the IP address of the dual-mode terminal 300 was not established by the old packet data service node 100 (NO in step S100), the old packet data service node 100 establishes a tunneling path to the new packet data service node 101 which established the IP address (step S200). That is, the old packet data service node 100 is connected to the new packet data service node 101.

Figure 12:
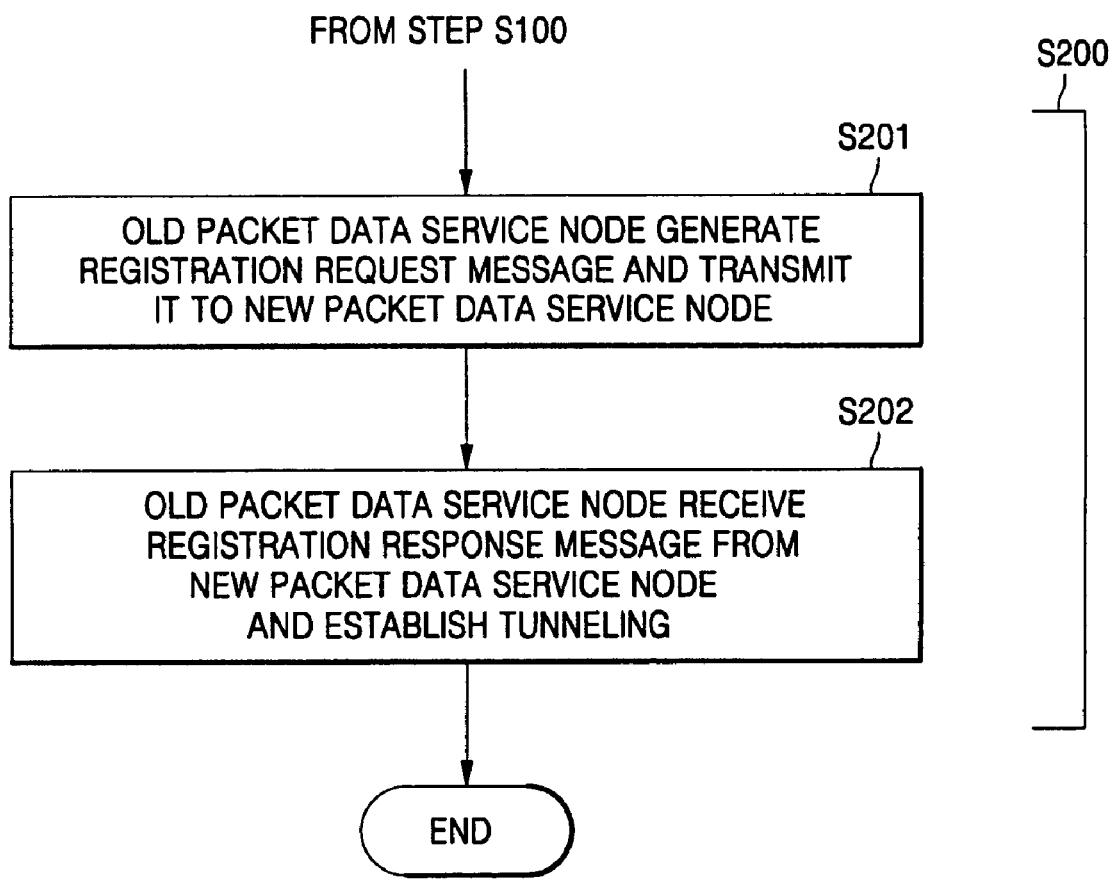
FIG. 12 is a flowchart showing in detail step S200, where a packet data service node 100 establishes a tunneling path to an new packet data service node 101 whose IP address was established by the packet data service node 100, in the active handoff method of a dual mode terminal capable of connecting to a wireless network and a mobile communication system according to FIG. 10.
Figure 13:
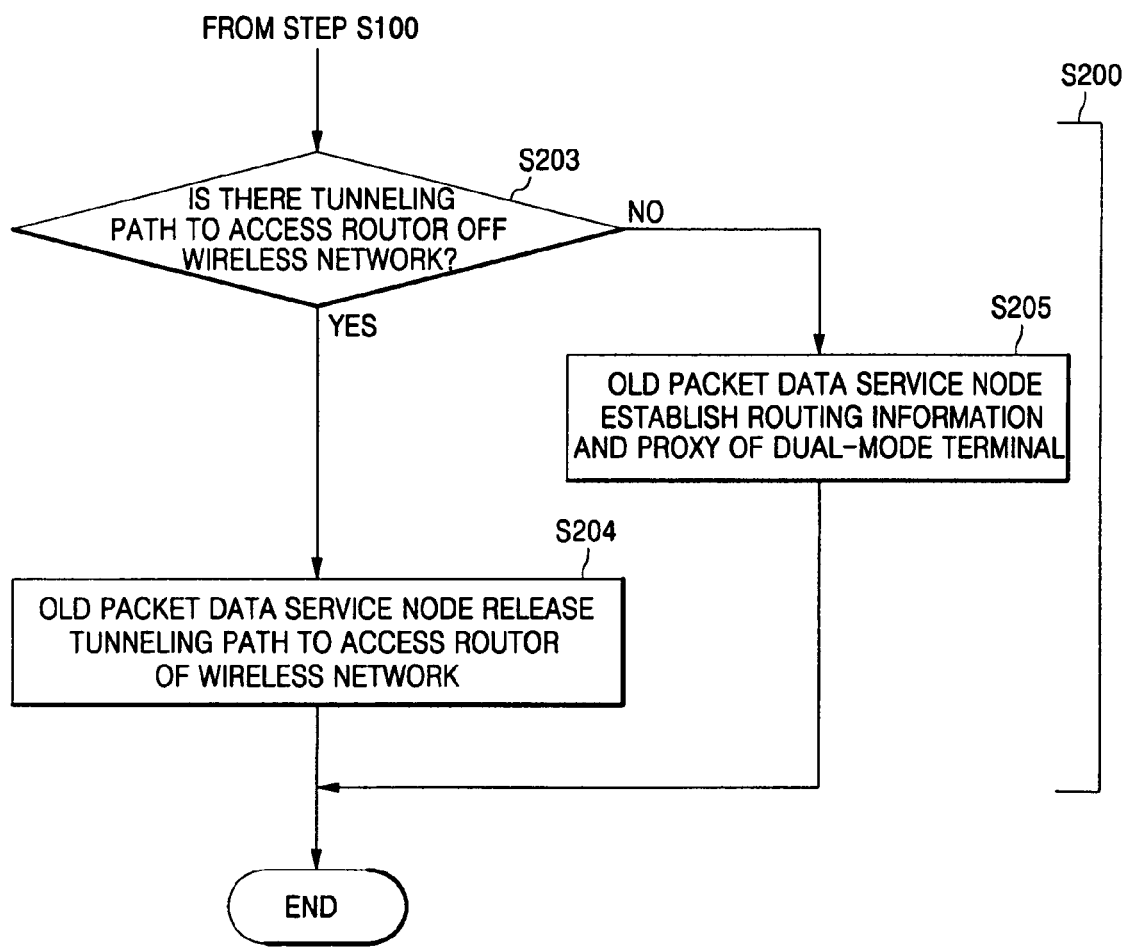
FIG. 13 is a flowchart showing in detail step S200, where a packet data service node 100 establishes a tunneling path to the new packet data service node 101 whose IP address was established by the packet data service node 100, in the active handoff method of a dual mode terminal capable of connecting to a wireless network and a mobile communication system according to FIG. 10.

Step S200, where the old packet data service node 100 establishes a tunneling path to new packet data service node 101 which established the IP address, will now be described in greater detail with reference to FIG. 12.

First, the old packet data service node 100 generates a registration request message and transmits it to the new packet data service node 101 (step S201). Here, the registration request message includes an IP address of a dual-mode terminal 200 and a number MIN.

Subsequently, the old packet data service node 100 receives a registration response message including a tunneling path generation result from the new packet data service node 101 and establishes a tunneling path (step S202).

Further, the old packet data service node 100 determines whether there is a tunneling path to the access router of wireless network 200 (step S203).

Here, when it is determined that there is a tunneling path to the access router of wireless network 200 (YES in step S203), the old packet data service node 100 releasing the tunneling path (step S204).

On the other hand, when it is determined that there is no tunneling path to the access router of wireless network 200 (NO in step S203), the old packet data service node 100 sets up routing information and a proxy of the dual-mode terminal 200 (step S205).

Figure 14:
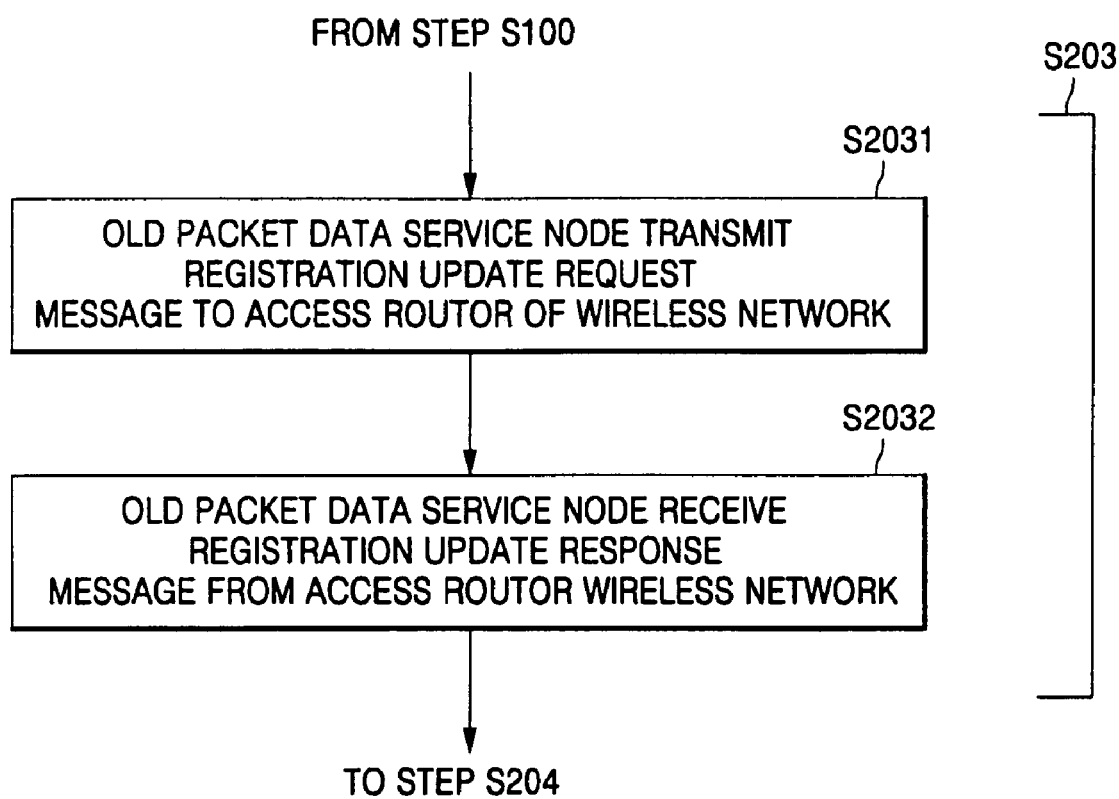
FIG. 14 is a flowchart showing in detail step S203, where a packet data service node 100 determines whether there is a tunneling path to a wireless LAN 200 in step S200, where the packet data service node 100 establishes a tunneling path to the new packet data service node 101 whose IP address was established by the packet data service node 100, in the active handoff method of a dual mode terminal capable of connecting to a wireless network and a mobile communication system according to FIG. 13.

Step S203 where it is determined whether there is a tunneling path to the access router of wireless network 200 will now be described in greater detail with reference to FIG. 14.

The old packet data service node 100 transmits a registration update request message to the access router of wireless network 200 (step S2031). Here, the registration update request message includes an IP address of the dual-mode terminal 300.

Subsequently, the old packet data service node 100 receives a registration update response message from the access router of wireless network 200 and releasing a tunneling path to the access router of wireless network 200 (step S2032).

On the other hand, when it is determined that the IP address of the dual mode terminal 300 was established by the old packet data service node 100 in step S100, the old packet data service node 100 sets up routing information and a proxy of the dual-mode terminal 300 (step S300).

Figure 15:
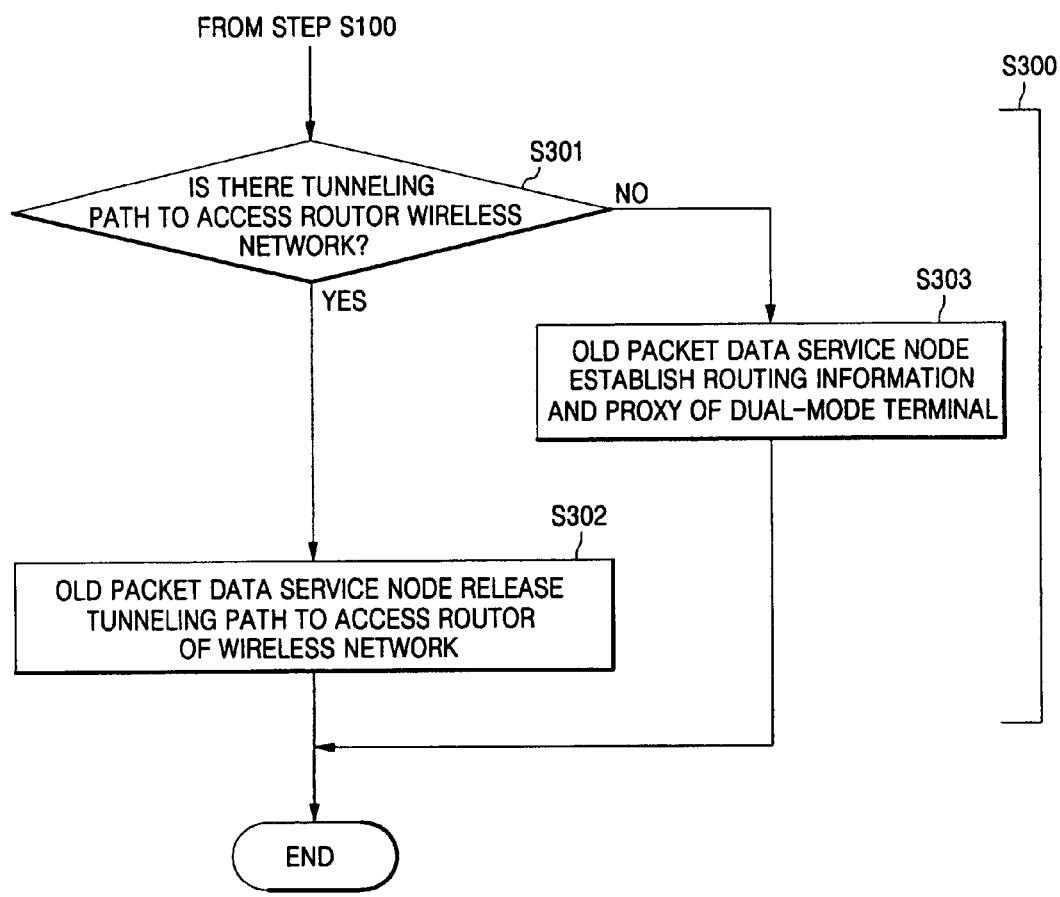
FIG. 15 is a flowchart showing in detail another embodiment of step S300, where a packet data service node 100 establishes routing information to a dual mode terminal 300, in the active handoff method of a dual mode terminal capable of connecting to a wireless network and a mobile communication system according to FIG. 10.

Step S300, where the old packet data service node 100 sets up routing information and a proxy of the dual-mode terminal 300, will now be described in greater detail with reference to FIG. 15.

First, the old packet data service node 100 determines whether there is a tunneling path to the access router of wireless network 200 (step S301).

Figure 16:
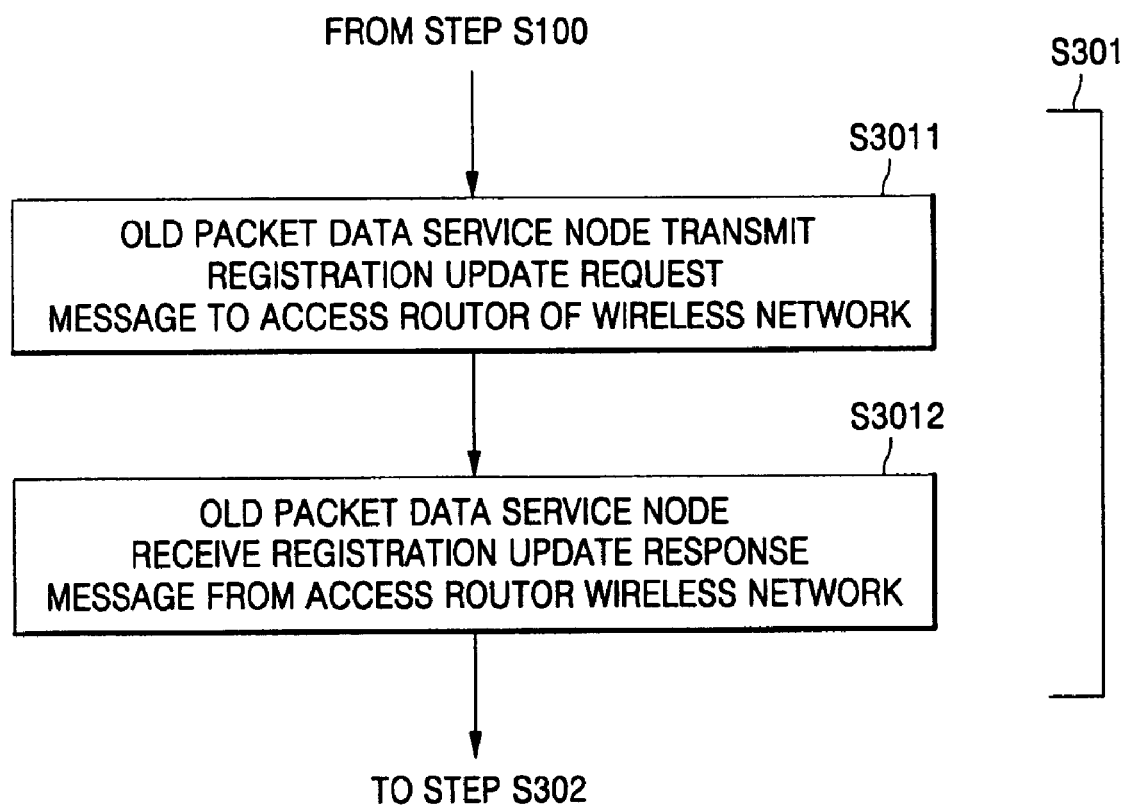
FIG. 16 is a flowchart showing in detail step S301, where a packet data service node 100 sets up routing information and a proxy of the dual mode terminal 300 in an active handoff method of a dual mode terminal capable of connecting to a wireless network and a mobile communication system according to FIG. 15.

Step S301, where it is determined whether there is a tunneling path to the access router of wireless network 200, will be described in greater detail with reference to FIG. 16.

First, the old packet data service node 100 transmits a registration update request message to the access router of wireless network 200 (step S3011). Here, the registration update request message includes an IP address of the dual-mode terminal 300.

Subsequently, the old packet data service node 100 receives the registration update response message from the access router of wireless network 200 and releasing the tunneling path to the access router of wireless network 200 (step S3012).

Here, when it is determined that there is a tunneling path to the access router of wireless network 200 (YES in step S301), the old packet data service node 100 releasing the tunneling path to the wireless network (step S302).

When it is determined that there is no tunneling path to the access router of wireless network 200 (NO in step S301), the packet data service node sets up routing information and the proxy of the dual-mode terminal 300 (step S303).

Here, the access router of wireless network 200 receives a registration update request message from the old packet data service node 100.

Then, the access router of wireless network 200 generates a registration update response message and transmits it to the old packet data service node 100 so as to establish a tunneling path.

Meanwhile, the access router of wireless network 200 receives a registration disconnect request message from the old packet data service node 100.

Subsequently, the access router of wireless network 200 transmits the registration disconnect response message to the old packet data service node 100 and then releasing the tunneling path to the old packet data service node 100.

As described above, according to an active handoff system of a dual-mode terminal capable of connecting to a wireless network and a mobile communication system in accordance with exemplary embodiments of the present invention, a dual-mode terminal that has moved to a wireless network from a 3G mobile communication system in an active state maintains an existing IP address assigned from an active 3G mobile communication system so that the dual-mode terminal can maintain an upper layer session and transmit an IP packet to a terminal located in a 3G mobile communication system.

Further, according to an exemplary implementation of the present invention, if the dual-mode terminal moves from the 3G mobile communication system to a wireless LAN, the IP address of the terminal can be reused without using a mobile IP address through a direct tunneling path from the 3G mobile communication system to the wireless LAN, and all packets transmitted to the terminal are transmitted through the tunneling path from the packet data service node to the wireless LAN router so that the upper layer session can be maintained.

While the present invention has been described with reference to exemplary embodiments thereof, it will be understood by those skilled in the art that various changes in form and detail may be made therein without departing from the scope of the present invention as defined by the following claims.

What is claimed is:

1. A handoff method of a dual mode terminal capable of connecting to a mobile communication system and a wireless network, the method comprising the steps of:
    assigning, at a old packet data service node(PDSN) of a mobile communication system, an Interne Protocol (IP) address to a dual mode terminal connected to the old PDSN;
    establishing, at the old Packet data service node, a tunneling path to a access router when the dual mode terminal moves from a mobile communication network to the wireless network; and
    releasing, at a old packet data service node, the tunneling path to the access router according to IP establishment option message when the dual mode terminal moves from the wireless network to the mobile communication system.

2. The method according to claim 1, wherein the assigning of the IP address comprises establishing, at the old packet data service node, an IP address to a Point-to-Point (PPP) link layer of the dual mode terminal upon receipt of a packet call from the dual mode terminal.

3. The method according to claim 1, wherein the IP establishment option message comprises an IP address of the dual mode terminal and anchor IP address.

4. The method according to claim 1, wherein releasing the tunneling path to the access router comprises:
    receiving, at the old packet data service node, an IP establishment option message from the dual mode terminal;
    determining, at the old packet data service node, whether the anchor IP address is identical with a IP address of the old PDSN;
    releasing, at the old PDSN, the tunneling path to the access router when it is determined that anchor IP address is identical with IP address of the old packet data service node.

5. The method according claim 4, wherein releasing the tunneling path to the access router comprises:
    transmitting, at the old PDSN, a registration update request message to the access router; and
    receiving, at the old PDSN, a registration update response message from the access router.

6. The method according to claim 5, wherein the registration update request message comprises an IP address of the dual mode terminal.

7. The method according to claim 1, wherein the wireless network comprises a wireless local area network (LAN).

8. A handoff method of a dual mode terminal capable of connecting to a mobile communication system and a wireless network, the method comprising the steps of:
    assigning, at a old packet data service node(PDSN) of a mobile communication system, an Interne Protocol (IP) address to a dual mode terminal connected to the old PDSN;
    establishing, at the old PDSN, a tunneling path to a access router when the dual mode terminal moves from a mobile communication network to the wireless network; and
    establishing, at a new PDSN, a tunneling path to the old PDSN according to IP establishment option message when the dual mode terminal moves from the wireless network to the mobile communication system.

9. The method according to claim 8, wherein the assigning of the IP address comprises establishing, at the old PDSN, an IP address to a Point-to-Point (PPP) link layer of the dual mode terminal upon receipt of a packet call from the dual mode terminal.

10. The method according to claim 8, wherein the IP establishment option message comprises an IP address of the dual mode terminal and anchor IP address.

11. The method according to claim 8, establishing a tunneling path to the old PDSN comprises:
    receiving, at the new PDSN, an IP establishment option message from the dual mode terminal;
    determining, at the new PDSN, whether the anchor IP address is identical with a IP address of the new PDSN; and
    establishing, at a new PDSN, a tunneling path to the old PDSN when it is determined that anchor IP address is not identical with IP address of the new PDSN.

12. The method according to claim 8, further comprising setting up, at the new packet data service node, routing information and a proxy of the dual mode terminal.

13. The method according to claim 8, wherein the establishing of the tunneling path to the old packet data service node comprises:
    generating, at the new packet data service node, a registration request message and transmitting the message to the old packet data service node; and
    receiving, at the new packet data service node, a registration response message comprising a tunneling generation result from the old packet data service node, and establishing the tunneling path.

14. The method according to claim 13, wherein the registration request message comprises at least one of the IP address of the dual mode terminal and the number MIN.

15. The method according to claim 13, wherein the establishing of the tunneling path to old packet data service node further comprises:
determining whether the old packet data service node comprises the tunneling path to the access router; and
disconnecting, at the old packet data service node, the tunneling path to the access router, when it is determined that the packet data service node comprises the tunneling path to the access router.

16. The method according to claim 8, wherein the wireless network comprises a wireless local area network (LAN).

17. A handoff system of a dual mode terminal capable of connecting to a mobile communication system and a wireless network, the system comprising:
a packet data service node(PDSN) for performing a handoff by establishing and releasing a tunneling path to at least one of a wireless network or another packet data service node according to IP establishment option message, and assigning an IP address to a dual mode terminal; and
a wireless network for performing a handoff through a tunneling path to the packet data service node when the dual mode terminal enters into the wireless network;
wherein the packet data service node transmits and receives an IP establishment option message to and from the dual mode terminal, releasing the tunneling path to the wireless network, and performs a handoff through a tunneling path to another packet data service node when the dual mode terminal does not comprise the IP address established by the packet data service node through the IP establishment option message.

18. A handoff system of a dual mode terminal capable of connecting to a mobile communication system and a wireless network, the system comprising:
a packet data service node(PDSN) for performing a handoff by establishing and releasing a tunneling path to at least one of a wireless network or another packet data service node according to IP establishment option message, and assigning an IP address to a dual mode terminal; and
a wireless network for performing a handoff through a tunneling path to the packet data service node when the dual mode terminal enters into the wireless network;
wherein the packet data service node releasing the tunneling path to the wireless network and re-sets up routing information and a proxy of the dual mode terminal when the dual mode terminal comprises the IP address established by the packet data service node.

* * * * *